US012737671B2

(12) United States Patent
Geiger et al.

(10) Patent No.: US 12,737,671 B2
(45) Date of Patent: Sep. 15, 2026

(54) RAPID DEPLOYMENT MACHINE LEARNING SYSTEM

(71) Applicant: Axon Enterprise, Inc., Scottsdale, AZ (US)

(72) Inventors: Avi R. Geiger, Seattle, WA (US); Leo Dirac, Seattle, WA (US)

(73) Assignee: Axon Enterprise, Inc., Scottsdale, AZ (US)

(*) Notice: Subject to any disclaimer, the term of this patent is extended or adjusted under 35 U.S.C. 154(b) by 1091 days.

(21) Appl. No.: 17/502,016

(22) Filed: Oct. 14, 2021

(65) Prior Publication Data

US 2023/0117932 A1 Apr. 20, 2023

(51) Int. Cl.

*G06N 20/00* (2019.01)
*G06F 18/21* (2023.01)
*G06F 18/24* (2023.01)
*G06F 40/20* (2020.01)

(52) U.S. Cl.

CPC ......... *G06N 20/00* (2019.01); *G06F 18/2178* (2023.01); *G06F 18/24* (2023.01); *G06F 40/20* (2020.01)

(58) Field of Classification Search

CPC ..... G06N 20/00; G06F 40/20; G06F 18/2178; G06F 18/24

See application file for complete search history.

(56) References Cited

U.S. PATENT DOCUMENTS 7,720,674 B2 * 5/2010 Kaiser ............... G06F 16/24522 704/7
11,651,197 B2 * 5/2023 Menezes ................ G06N 3/063 706/21
11,901,047 B2 * 2/2024 Zhou ...................... G06V 10/40
11,914,650 B2 * 2/2024 Trim ................ G06F 16/90332

(Continued)

FOREIGN PATENT DOCUMENTS

WO WO-0129823 A1 * 4/2001 ............. G10L 15/22
WO WO-2017062635 A1 * 4/2017 ............. G06N 5/022

OTHER PUBLICATIONS

Asakiewicz et al., "Building a Cognitive Application Using Watson DeepQA", Aug. 2017, Cognitive Computing, pp. 36-44 (Year: 2017).*

(Continued)

*Primary Examiner* — Paulinho E Smith
(74) *Attorney, Agent, or Firm* — Andrew Graham

(57) ABSTRACT

A machine learning system may be deployed with a less-than-optimal classification system, but may include a human in the loop system to rapidly assist in classification and deployment. The human's input may be returned as a response to a query and may also be stored for re-training the machine learning system. With a rapid human response, a machine learning system may be deployed and may "learn" over time. A multi-stage human intervention system may have a rapid response human interface, and if the first human encounters ambiguity, the request may be elevated to a second stage human expert for resolution. Such a system (Continued)

may be deployed using a generic or semi-generic classification system, and as the human responses are accumulated, the machine learning system may be repeatedly re-trained to reach a desired performance level.

20 Claims, 5 Drawing Sheets

(56) References Cited

U.S. PATENT DOCUMENTS

| | | | | |
|---|---|---|---|---|
| 11,921,761 | B2 * | 3/2024 | Kondadadi | G06N 3/08 |
| 12,125,501 | B2 * | 10/2024 | Caba Heilbron | G06V 40/174 |
| 2002/0144293 | A1 * | 10/2002 | Dimitrova | G06F 16/732<br>725/141 |
| 2009/0058860 | A1 * | 3/2009 | Fong | G06F 40/103<br>704/9 |
| 2014/0310614 | A1 * | 10/2014 | Jones | G06Q 10/107<br>715/753 |
| 2014/0316764 | A1 * | 10/2014 | Ayan | H04M 3/4936<br>704/9 |
| 2016/0048772 | A1 * | 2/2016 | Bruno | G06N 5/04<br>706/11 |
| 2017/0098161 | A1 * | 4/2017 | Ellenbogen | G06V 10/454 |
| 2017/0140289 | A1 * | 5/2017 | Block | G06N 5/02 |
| 2018/0082032 | A1 * | 3/2018 | Allen | G16H 40/67 |
| 2019/0103092 | A1 * | 4/2019 | Rusak | G06N 3/045 |
| 2020/0050942 | A1 * | 2/2020 | Sun | G06N 3/044 |
| 2021/0081442 | A1 * | 3/2021 | Ganu | G06N 20/00 |
| 2021/0097978 | A1 * | 4/2021 | Mei | G10L 15/183 |
| 2021/0182604 | A1 * | 6/2021 | Anthony | G08G 1/0141 |
| 2021/0191926 | A1 * | 6/2021 | Izenson | G06N 5/04 |
| 2021/0343415 | A1 * | 11/2021 | Allen | G16H 40/20 |
| 2022/0130499 | A1 * | 4/2022 | Zhou | G06V 10/25 |
| 2022/0300716 | A1 * | 9/2022 | Sabharwal | G06F 16/24578 |
| 2022/0391595 | A1 * | 12/2022 | Shevelev | G06N 3/08 |
| 2023/0117932 | A1 * | 4/2023 | Geiger | G06V 10/764<br>706/12 |
| 2024/0130621 | A1 * | 4/2024 | Islam | A61B 5/0022 |

OTHER PUBLICATIONS

Zhoa et al., “Multi-Model Question Answering System Driven by Domain Knowledge Graph”, 2019, IEEE Explore, pp. 43-47. (Year: 2019).*

Yeo et al., “A Machine Learning Based Natural Language Question and Answering System for Healthcare Data Search using Complex Queries”, 2018, IEEE, pp. 2467-2474 (Year: 2018).*

Srivastava at al., “Adapting Visual Question Answering Models for Enhancing Multimodal Community Q&A Platforms”, May 25, 2019, arXiv.com, pp. 1-10 (Year: 2019).*

* cited by examiner

RAPID DEPLOYMENT MACHINE LEARNING SYSTEM

BACKGROUND

Machine learning systems offer the promise of very sophisticated classification and data analytics. Such systems are able to be "trained" to identify or classify objects within images, as well as to understand natural language and other use cases.

Machine learning systems often require a set of "training data" that are pre-classified objects that are used to train a neural net or other classifier. The training data is often developed with the help of a human expert. However, the training data is usually the result of thinking through all the various inputs and outputs prior to deploying the machine learning system.

SUMMARY

A machine learning system may be deployed with a less-than-optimal classification system, but may include a human in the loop system to rapidly assist in classification and deployment. The human's input may be returned as a response to a query and may also be stored for re-training the machine learning system. With a rapid human response, a machine learning system may be deployed and may "learn" over time. A multi-stage human intervention system may have a rapid response human interface, and if the first human encounters ambiguity, the request may be elevated to a second stage human expert for resolution. Such a system may be deployed using a generic or semi-generic classification system, and as the human responses are accumulated, the machine learning system may be repeatedly re-trained to reach a desired performance level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Machine Learning System As-A-Service

Figure 1:
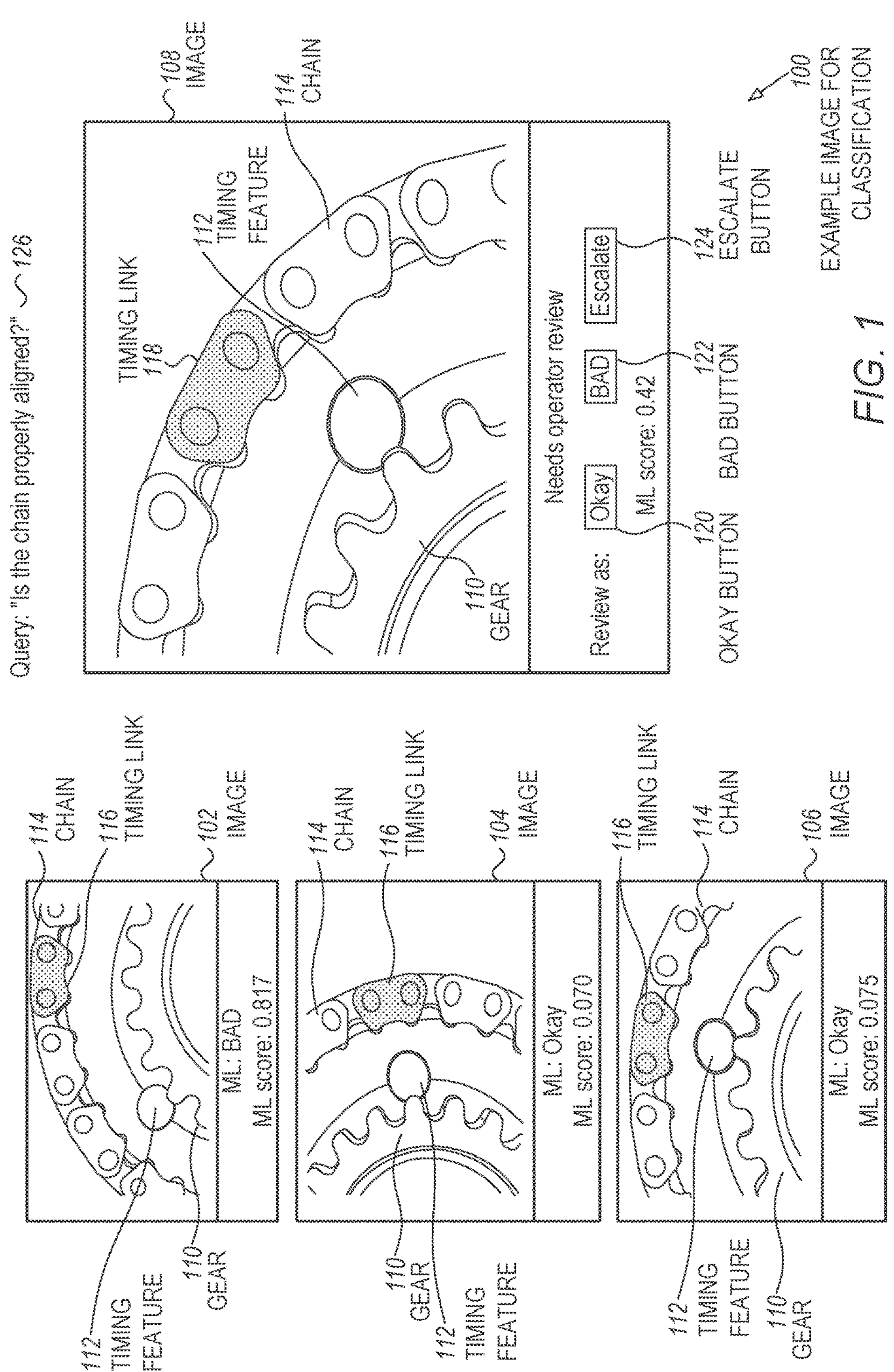
FIG. 1 is a diagram illustration of an embodiment showing an example set of images and queries.

A machine learning system may be rapidly deployed with a generic or thinly-trained algorithm. A rapid response human in the loop system may manually handle classification responses where the classifier has a low accuracy. The human responses may be fed back to the machine learning system to re-train the system and increase its accuracy.

The machine learning system may be deployed as an application programming interface (API) where a developer may add a machine learning classifier for a portion of the developer's overall application. The machine learning algorithm may begin operation with a generic classifier or a classifier that has been trained for another purpose, and with a rapid human response, may be trained for the specific queries and datasets that the developer intends.

The rapid human response to a query may be triggered when a classifier performs a classification but encounters a low confidence score. The low confidence score may trigger a human intervention to perform the classification. The human's response may be sent as a response to the query, but the response may also be used for re-training the classifier. When the classifier is retrained with the human's response, the classifier will automatically respond in the future to a similar query with a higher confidence.

In many deployments, a human-in-the-loop may quickly train a machine learning algorithm for robotics or other use cases. Within a few minutes, a human may classify images seen by a robot in real time, and a machine learning algorithm may quickly learn from those images. For example, a vision system for a robot arm may present an image of a vise and a part loaded in the vise. When the part is correctly oriented, a human may mark the image as correct, but given an image where the part is incorrectly oriented, the human may mark the image as incorrect.

In the example, the robot may be trained to identify properly oriented parts within five minutes. As the robot continues to perform its tasks with the part and the vise, the machine learning system may produce queries for the human operator to manually classify changes to the images. For example, a wire may be moved within the image, which may cause the machine learning system to render a low confidence. The image and query may be sent to the human operator, who may indicate that the operation is OK. From that point forward, the positions of the wire in the image may be considered unimportant, but the machine learning algorithm may still consider the position of the part and the vise as important.

The human in the loop system may have multiple levels or stages of human interaction. A first stage may be a rapid response with humans who respond relatively quickly. During such a stage, a processing token may be transmitted across an API interface to let the requesting system know that the response is being processed but to expect a delay. The human may receive the query information and may manually assess the query and provide a response. The human's response may be transmitted across the API interface in response to the original request.

In some cases, the first human responder may not understand the query or may not have the expertise to create a response. For example, a request may be ambiguous to the first responding human, or the human may not have the expertise to determine the proper classification. The human may escalate the request to an expert who may analyze the query and provide a response.

A machine-learning-as-a-service model may provide a group of human responders as part of a machine learning service. These responders may be available to provide rapid responses, but these responders may not have expert knowledge of the domains being trained. A second level or second stage of responders may be experts in the domain and their responses may be given a higher confidence than the first level responders.

Machine Learning In Multiple Domains

Conventionally, machine learning has been applied to object classification in images, as well as natural language processing and other use cases. When machine learning in natural language processing is combined with machine learning of object recognition in images or video, the complexity is an order of magnitude greater. However, by deploying a generic or previously-trained classifier with a human in the loop assistance, successful deployments of machine learning classifiers in even this more complex use case can occur.

A machine learning system may deploy a natural language interface to query an image or video. Such a system may present an image or video to be analyzed, along with a natural language query relating to the image.

One use case may be for a robot vision system to be queried "is the vise closed property?" after placing an object in the vise. An API will be sent the video from the robot, along with the query language. This type of query is moderately complex because two elements are determined: where is the vise in the image? and what state is the vise, open or closed? The possible responses may be: no vise found, vise is properly closed, or vise is not properly closed.

In the example, the natural language query may be parsed to identify the objects within the image, and then determine their state. The object in the example is a vise, and the state in the example is properly closed or not properly closed.

In a different deployment of the example, the machine learning algorithm may be trained using an unparsed, unanalyzed natural language query as the input to classification. Such a system may forego having a complex natural language parser or other processing. Such a system may have the benefit of no intermediate processing between the query analyzed by a human operator and the machine learning algorithm.

It may be noted that the combination of natural language queries and image analysis/object recognition is likely to be an order of magnitude more complex than training either a natural language processor or an image classifier. However, by using a standardized or generic pre-trained classifier with a human response system, such a complex system may be deployed and trained rapidly.

Architecture for Machine Learning System

An architecture for machine learning systems may include a close-to-the-edge classification engine, along with a cloud-based classifier. The classification engine "close to the edge" may be a classifier that may be located close to the source of the data. In the case of image recognition, the close-to-the-edge classifier may reside in the camera or near the camera that takes the image. Such a classifier may be able to process queries very quickly with minimum data transfer.

When the first classifier is unsuccessful, however, the image data and query may be transferred to a cloud-based classifier. The cloud-based classifier may be a more highly trained or more complex classifier that may have been trained on a larger dataset. In a typical deployment, the cloud-based classifier may be connected to several edge-based classifiers and may therefore have access to a much larger dataset.

Such a system may be a two-stage classifier with a lightweight edge-based classifier and a more robust, more complex classifier available when the first classifier is unsuccessful.

A human may be queried when one or both of the classifiers do not generate a high enough confidence score in their matching algorithms.

Escalation Process for Human Classification

The human interface may be designed so that a human may quickly understand the query and may have access to the image or video related to the query. In one example, a cell phone application may present the image or video to the human responder along with a natural language query. The human may read the query and try to find the appropriate answer to the query by analyzing the image.

When the human determines the answer to the query, the human may input the answer within the cell phone application, which may transmit the answer to the application programming interface of the machine learning system.

If the human is uncertain about the query or their answer to the query, the human may escalate the request to a more highly trained human or expert. The expert may then answer the query.

In some cases, the human responder may ask for clarification on the query or the image. In such a case, the human responder may ask a clarifying question that may be transmitted across the application programming interface back to the system that transmitted the original request.

An escalation path may allow a human to determine that they do not know the answer, or that they have low confidence in their answer. By deploying an escalation path, human operators may request more information or pass the query to a human operator with more experience, knowledge, or training. Such a system may be beneficial to deploy a first-tier human assistance that may have general training, but may be backed up with a higher-tier human experts that may help with the more difficult queries.

Rapid Deployment

A machine learning system may be rapidly deployed using a generic, pre-trained machine learning system. In many cases, the generic machine learning system may have some domain-specific training, but in many cases, the machine learning system may have been trained on data from a different domain. Such a generic classifier may provide at least some responses initially to a query, even if the responses have less than optimal confidence scores.

During the initial phases of deployment, a human response system may manually process many of the requests that may have low confidence by the machine learning classifier. As the human responses are collected and the machine learning classifier is retrained using the human responses, the machine learning classifier may become increasingly more accurate. As the accuracy and confidence scores improve, fewer human responses may be requested, and the system may transition to a much more automatic system.

Even when a machine learning system has been trained and most, if not all queries are answered automatically with the machine learning classifier, there may be cases where the human responder may be used. For example, the human may be used to analyze random queries to validate that the response from the machine learning classifier. In another example, the confidence score threshold for the machine learning classifier may be raised over time. In such an example, the lower confidence responses by the classifier may be analyzed by a human and the responses may be used to further increase the classifier's confidence score.

Throughout this specification, like reference numbers signify the same elements throughout the description of the figures.

In the specification and claims, references to “a processor” include multiple processors. In some cases, a process that may be performed by “a processor” may be actually performed by multiple processors on the same device or on different devices. For the purposes of this specification and claims, any reference to “a processor” shall include multiple processors, which may be on the same device or different devices, unless expressly specified otherwise.

When elements are referred to as being “connected” or “coupled,” the elements can be directly connected or coupled together or one or more intervening elements may also be present. In contrast, when elements are referred to as being “directly connected” or “directly coupled,” there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration showing an embodiment 100 of several images that may be analyzed using a natural language query. In the example, a gear 110 and a timing chain 114 are shown in several different configurations. The gear 110 has a timing feature 112 and the chain 114 has a timing link 116. The example shows several different configurations of the two items, and a query 126 asks “is the timing chain properly aligned?”

The example of embodiment 100 illustrates a typical use case for a machine learning classifier that incorporates a vision system and a natural language query. In such a situation, a natural language query may be executed against the image. This may be performed using a natural language processor to parse the query, then a machine learning classifier to analyze the image using the parsed natural language.

Embodiment 100 is an example of a machine learning system that may be used in robotics, manufacturing, or any other industry or situation where an image may be queried. The combination of natural language processing and image analysis also means that the deployment of such analyses can be very rapid, without a lot of programming, training, or other expertise.

A natural language interface to image analysis can accept a query in a wide range of expressions. As such, a meaningful and useful analysis system can be deployed without a precise, pre-defined syntax, such as a computer programming language commonly used for image analysis. The natural language interface effectively eliminates complex programming for deploying the image analysis.

Natural language interfaces may reduce the deployment time, but it may add a layer of uncertainty for image analysis. Not only are the inherent uncertainty factors of image analysis present, but the uncertainty, imprecision, and ambiguity of natural language are also a factor.

By having a human in the loop for deployment and operation of such a system, the ambiguity of both the natural language processing and image analysis can be overcome. During an initial deployment phase, many or all of the queries and/or images may present themselves as ambiguous or with uncertain analysis results. Such results may be reviewed by a human operator. When the human operator arrives at an analysis result with confidence, the machine learning algorithm may be retrained and improved.

Embodiment 100 shows images 102, 104, 106, and 108. In each of the images, a gear 110 with its timing feature 112 is illustrated with a timing chain 114 and a timing link 116. In this example, a correctly assembled gear and timing chain may have the timing link 116 positioned directly next to the timing feature 112 on the gear 110.

Image 102 illustrates a badly assembled chain 114. The timing feature 112 of the gear 110 is several links away from the timing link 116 of the chain 114. Images 104 and 106 illustrate a correctly assembled gear 112 and chain 114, where the timing feature 112 is directly opposite the timing link 116.

Image 108 illustrates an example where a machine learning classifier is not confident in its analysis. In this example, the timing link 118 of the chain 114 is a half-link away from the timing feature 112 of the gear 110. Because the machine learning classifier does not have a high degree of confidence in the analysis, the image 108 may be presented to a human operator for analysis.

A human operator may examine the image 108 and notice that the timing link 118 is very close, but not exactly aligned with the timing feature 112 of the gear 110. In this example, the human operator may press one of the three buttons of okay 120, bad 122, or escalate 124. If the requirements are that the timing link 118 must be precisely opposite the timing feature 112, the human operator may press the button for bad 122. The human operator's analysis may be used for retraining the machine learning classifier.

The human operator may have the option to escalate the analysis to a human expert. In a typical deployment, a human operator may be a person of little technical training, but a human expert may be an engineer who may be able to access the importance of the alignment of the two items, using our example.

A human expert may have a higher level of experience or training than the first-level human operator, and as such, any feedback from the expert human operator may be given higher weight during retraining than a first-level human operator's classification.

Figure 2:
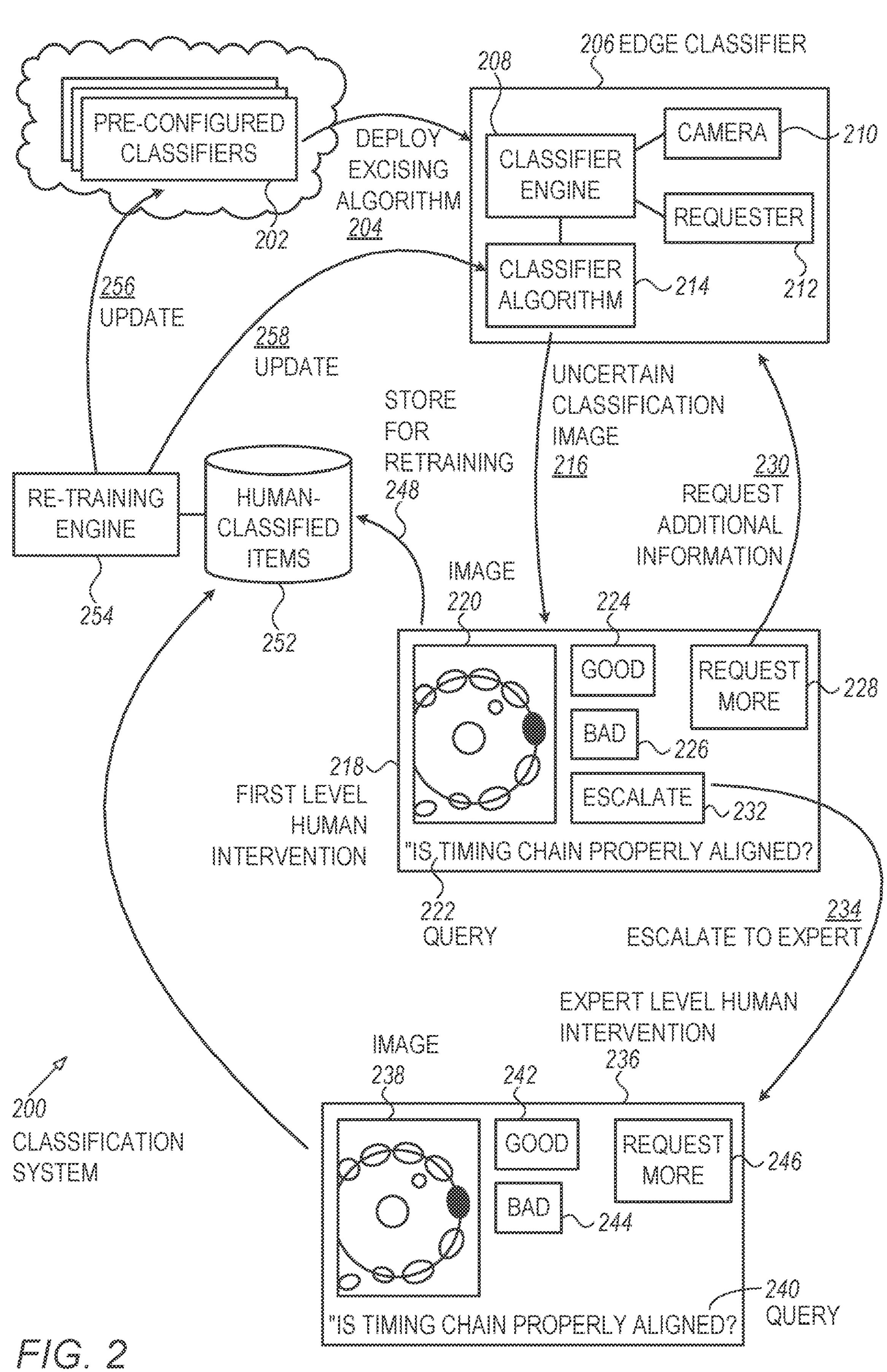
FIG. 2 is a diagram illustration of an embodiment showing a schematic or functional representation of a system and process for analyzing images and natural language queries using a human-in-the-loop.

FIG. 2 is a diagram illustration of an embodiment 200 showing a classification system as it may be deployed. The classification system may be deployed in an "edge computing" architecture, where a device close to the source of the data or close to the use of the classification output may reside. In a simple example, an edge computing use case may have an image classifier on a robot controller located within a factory. Another architecture may be a "cloud computing" architecture, where a centralized machine learning classifier may be deployed.

An "edge computing" architecture may have an advantage of fast response times, as a cloud computing architecture may transmit images to a distant server across the Internet, perform the analysis, and transmit a result back over the Internet. In an edge computing architecture, the processing may be performed locally without the latency and network traffic of the cloud computing architecture.

A cloud computing architecture may have an advantage of practically unlimited processing power, data storage, or other resources, whereas an edge computing system may be limited in such resources. In a cloud computing environment, extraordinarily complex classifiers may be deployed, whereas lighter-weight or more narrow classifiers may be appropriate for edge computing architectures.

When deploying classifiers in an edge computing environment, the classifiers may be relatively narrowly tuned for specific tasks. For example, a camera located on an industrial robot will typically only capture images within the reach of the robot. Such images may be highly repetitive and very similar, and a lightweight classifier may perform very well, especially when the queries are limited by the functions performed by the robot. Further, by having an edge-deployed classifier within a robot controller, the speed of analysis may enable real-time classification and decision-making from live video images. Real time classification and decision making in such a situation may not be as effective in a cloud-deployed classifier because of the latency and bandwidth of transmitting live video over a network.

Embodiment 200 shows a set of pre-configured classifiers 202. These classifiers 202 may be pre-trained machine learning algorithms, such as neural nets, that have been trained using natural language queries against various types of images. The pre-configured classifiers 202 may contain a classifier that may be appropriate for a specific deployment on an edge classifier 206, and the selected classifier may be deployed 204 into the edge classifier 206.

The edge classifier 206 may have a classifier engine 208 connected to an image source or camera 210 and a requester 212. The classifier engine 208 may execute a classifier algorithm 214, which may be a pre-trained neural net classifier, for example.

The camera 210 may be any image source to be analyzed. In some cases, the image source may be a still camera where individual images may be analyzed, while in other cases, the image source may be a video camera where a stream of images may be analyzed. The images may be analyzed individually or as a video stream.

The requester 212 may generate a query that may be executed against the image or images, and the requester 212 may receive the classification result from the analysis. The requester 212 may receive a natural language query as an input.

In some use cases, another system, not shown, may produce queries and receive the classification analysis. For example, a robotic controller may produce queries about objects being handled by the robot, and the controller may receive results.

In one such example, a robotic controller may produce a query asking whether a part is present and properly aligned in a holding fixture. The edge classifier 206 may receive the query, process the query against the current image produced by a camera on the robot, and return several responses. The responses may include the part is not present, the part is present but misaligned, or the part is present and properly aligned. The robotic controller will receive the response and perform a sequence in response, such as realigning the part if it is present and misaligned.

The edge classifier 206 may be any deployment of a classification system. In many cases, the edge classifier 206 may be physically located near the image source or may be located near the use point for the classification output. However, some use cases may not be physically located near either the source or use point. Some such deployments may be tailored or tuned classifiers for specific use cases which may or may not be physically located near the source or use point.

The notion of an "edge classifier" may be any classification system that may have a limited or directed use, or where the feedback loop may focus or refine the classifier for a specific use case. In some cases, the edge classifier may be deployed with a general-purpose classification algorithm, but that algorithm may be tuned for the individual use case by a feedback loop of human classified images. As the tuning progresses, the edge classifier may become more accurate for that specific use case.

When the classifier algorithm 214 performs its operation, it may generate a confidence score. A confidence score may be a numerical value of the degree to which the algorithm matches the result and the image. When the confidence score is lower than a predetermined threshold, the classification may be considered uncertain. An uncertain classification image and query 216 may be transmitted to a first level human interaction system 218.

A first level human interaction system 218 may present the image 220 and query 222 to a human operator, who may attempt to form a response. In the example of embodiment 200, the first level human interaction system 218 may give the human operator the options to declare the image good 224 or bad 226. The human operator may press the corresponding button to dispose of the image and query very quickly.

The human operator may have the options to request more 228. The request more button may open an interface where the human operator may ask a clarifying question or request more information. Such an option may be useful when the natural language query 222 may be ambiguous or hard to understand.

When the human operator requests more information 230, the request may be transmitted to a local operator at the edge classifier 206 or to a person associated with the requester 212. For example, a programmer or other human who created the natural language request may be sent an email or other alert with the clarifying question from the human operator at the first level human intervention system 218. When the additional or clarifying information is received, it may be transmitted to the first level human intervention system 218 for further processing.

The first level human interaction system 218 may include an escalate button 232. The escalate button may transfer the image and query to a higher-level human who may be able to handle the query. An expert level human intervention system 236 may receive the image 238 and query 240, and such a system may have buttons for declaring the image good 242, bad 244, or to request more information 246.

The expert level intervention system 236 may be manned by a person with a higher level of skill, training, experience, authority, or other qualification than the operator of the first level human interaction system 218. In some cases, the expert person may have the bandwidth to further investigate the specific situation in more detail than the first level human operator.

By escalating a query to a higher-level operator, a first level operator may be able to handle the simpler, easier classification tasks that may be more clear cut. The more advanced classification tasks, or those that are not as clear cut, may be transferred to an expert for processing.

The results from both types of human operators may be stored for retaining in items 248 and 250. A set of human-classified items 252 may be gathered and a retraining engine 254 may update the classifier algorithm 214. In many cases, the updated classifier algorithm may be stored in the set of pre-configured classifiers 202 for deployment in other use cases.

In some scenarios, a higher weight may be given to results from an expert human and a lower weighting given to results from the first level operator.

It should be noted that the example of embodiment 200 illustrates a system with one tier of escalation. Other systems may be created with two, three or more tiers of escalation when a query cannot be answered accurately.

In the example of embodiment 200, a single human operator may process a query with uncertain classification. In other embodiments, an uncertain classification may be sent to several human operators who may separately and independently analyze the query and generate results. Such system may query several human operators to find a consensus result. Some such systems may return a result with high confidence when a majority of the human operators arrive at the same result, while other systems may return a result with high confidence when all of the human operators agree on the result.

Figure 3:
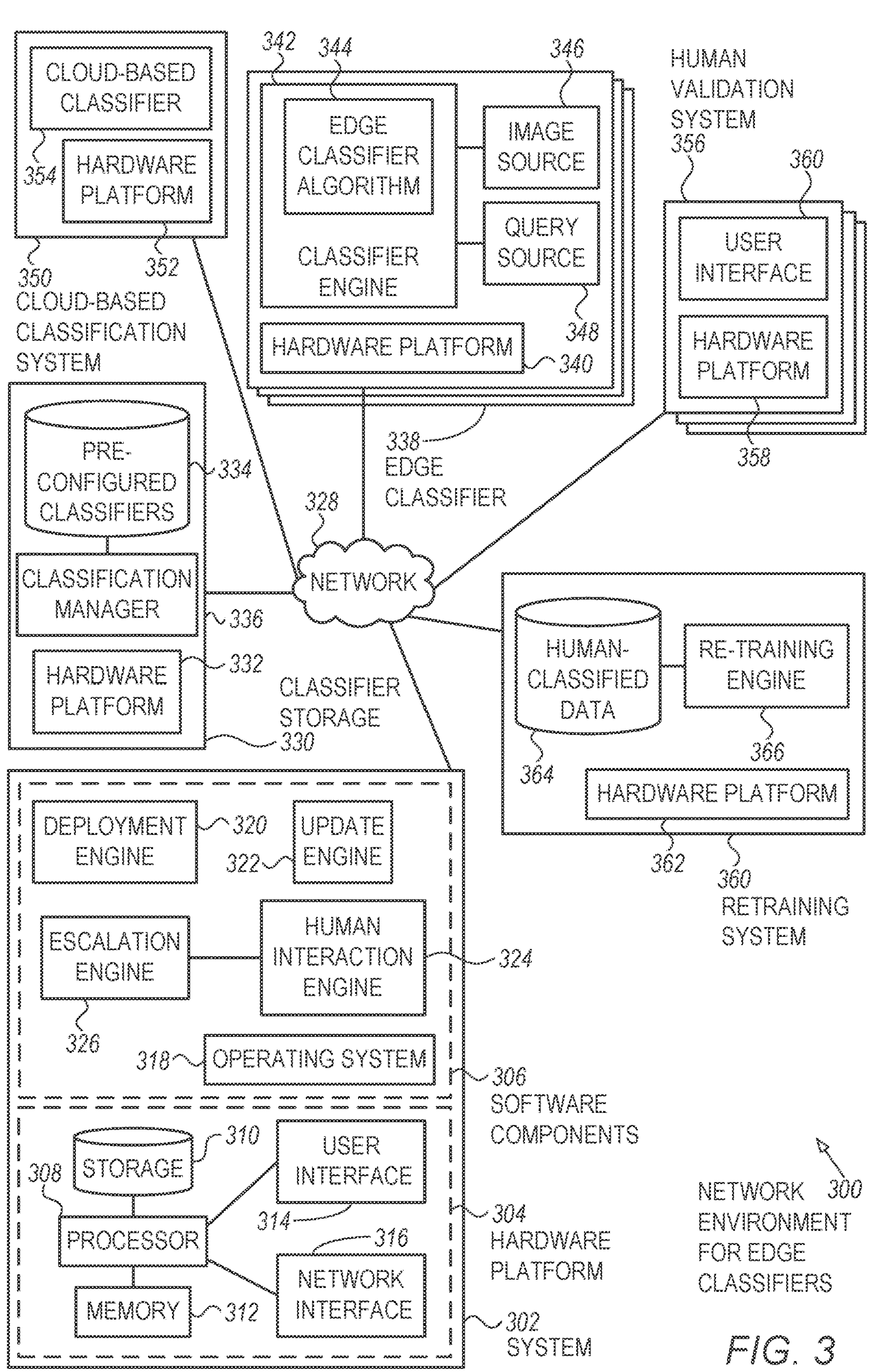
FIG. 3 is a diagram illustration of an embodiment showing a schematic or functional representation of a network various devices that may deploy an image analysis system with natural language queries.

The diagram of FIG. 3 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 300 illustrates a device 302 that may have a hardware platform 304 and various software components. The device 302 as illustrated represents a conventional computing device, although other embodiments may have different configurations, architectures, or components.

The hardware platform 304 may include a processor 308, random access memory 310, and nonvolatile storage 312. The hardware platform 304 may also include a user interface 314 and network interface 316.

The random access memory 310 may be storage that contains data objects and executable code that can be quickly accessed by the processors 308. In many embodiments, the random access memory 310 may have a high-speed bus connecting the memory 310 to the processors 308.

The nonvolatile storage 312 may be storage that persists after the device 302 is shut down. The nonvolatile storage 312 may be any type of storage device, including hard disk, solid state memory devices, magnetic tape, optical storage, or other type of storage. The nonvolatile storage 312 may be read only or read/write capable. In some embodiments, the nonvolatile storage 312 may be cloud based, network storage, or other storage that may be accessed over a network connection.

The user interface 314 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 316 may be any type of connection to another computer. In many embodiments, the network interface 316 may be a wired Ethernet connection. Other embodiments may include wired or wireless connections over various communication protocols.

The software components 306 may include an operating system 318 on which various software components and services may operate.

A deployment engine 320 may manage the deployment of new classification engines. The deployment engine 320 may receive requirements for a new deployment, identify an existing classification algorithm that may at least partially suit the situation, and cause the algorithm to be deployed.

The deployment engine 320 may install a classification engine in an edge device, the load the classification engine with a selected classification algorithm. The deployment engine 320 may configure the inputs from a query source and image source, as well as configure a system for human intervention when a classification operation has a low confidence.

When initially deployed, a classification system may have a partially trained classification algorithm and a system for a human-in-the-loop. Such a system may be deployed quickly, even if the classification algorithm may not be fully tuned and tested. Initially, the system may be less optimal, but the human classifier may quickly generate many human-classified data points that can be used to re-train the classification algorithm. Such a system may be deployed quickly, but may quickly improve its confidence levels such that the human-in-the-loop may not be used as frequently. Ultimately, the classification system may operate mostly autonomously with very little human interaction after being retrained.

An update engine 322 may manage the ongoing data gathering and retaining of a classification engine. The update engine 322 may gather human-validated data points and cause a classification engine to be retrained as these data points are gathered. Once retrained, the newly updated classification algorithm may replace the previous algorithm. Further, the update engine 322 may store the retrained algorithm for possible later deployment in a similar situation.

A human interaction engine 324 may be a software component that may manage the human-in-the-loop process. The process may be triggered when an algorithm performs a classification with a low confidence score, for example. The human interaction engine 324 may manage the workflow of transferring a classification request to a human operator. The workflow may involve placing the classification request in a queue for the human, receiving the human's response, transferring the human's response to the edge classifier, and tracking the human's performance.

The human's performance metrics may include the response time as well as the human's accuracy and repeatability. In some systems, a given query may be transmitted to several human operators to cross-check the human operators against each other. Some such systems may use a polling technique to find a valid answer by identifying a majority of the human operators. Other such systems may test or train the human operators by giving them queries that have been validated by other human operators.

The human interaction engine 324 may operate with an escalation engine 326. The escalation engine 326 may manage raising the query to a higher-level operator. Typically, the higher-level operator may be a human with more experience, education, training, or other qualification that may make them more of an expert to solve the query. In some cases, the higher-level operator may be given more time and resources to investigate the query and determine an appropriate answer.

Some embodiments of an escalation engine 326 may use several tiers of human operators, each with a different level of experience or expertise. In some cases, a first-level human operator may identify a specific type of advanced expertise for a specific query. Such a request may be routed to a human operator with the specific expertise for that type of request.

The devices illustrated in embodiment 300 may be connected through a communications network 328.

A classification storage system 330 may operate on a hardware platform 332 and have a database containing pre-configured classifiers 334. A classification manager 336 may receive a request for a classification algorithm having certain characteristics, search the database of pre-configured classifiers 334 to find a close match, and may make the selected classifier available. The classification manager 336 may also receive updated or new classifiers and add them to the database.

Several edge classifiers 338 may be deployed. Each deployment may operate on a hardware platform 340 and may contain a classifier engine 342 on which a classifier algorithm 344 may operate. The edge classifier 338 may have an image source 346 as well as a query source 348.

An edge classifier 338 may be any type of deployment of a specific classifier. In many cases, an edge classifier 338 may be deployed for a specific use case or scenario. Many edge classifiers 338 may have algorithms 344 that may be tuned, refined, and improved for the specific classification jobs seen by the edge classifier 338.

Some deployments may use a cloud-based classification system 350. Such systems may have larger resource pools and, in some cases, more sophisticated classification algorithms. A cloud-based classification system 350 may have a hardware platform 352 on which a cloud-based classifier 354 may operate. The cloud-based classifier 354 may be similar to the edge-based classifier 338 in the sense that the cloud-based classifier 354 may take images from a local image source 346 and queries from a local query source 348. However, the cloud-based classifier 350 may be available over a network 328.

The cloud-based classification system 350 may be updated as human operators perform classifications in the same manner as an edge-based classification system 338.

In some deployments, an edge-based classification system 338 may operate in conjunction with a cloud-based classification system 350. One such scenario may be for the edge-based classification system 338 to perform a first pass classification. When the first pass classification renders a result with high confidence, the result may be used immediately. When the first pass classification renders a result with a low confidence, the query may be passed to a cloud-based classification system 350. If the result still has a low confidence score, the query may be passed to a human operator.

In such a deployment, a more sophisticated classification algorithm may be available as a cloud-based classifier 350 than might be available on an edge classifier 338. Such a deployment may be useful when the edge classifier 338 may be a very lightweight system with little processing capability. For example, an edge classifier 338 may be an Internet of Things device, such as a battery-operated thermostat in a home. Such devices may have very low processing capabilities, but the device's processing power may be sufficient for a small classification algorithm. If the IoT device cannot effectively classify an image and query, the device may transmit the image and query to a cloud-based system 350 for further analysis.

Various human validation systems 356 may be deployed with a hardware platform 358 and a user interface 360. The human validation systems 356 may display an image and query for a human operator to solve. The human operator may be presented with a limited set of possible answers so that the human may quickly process an image and query.

In many cases, a human validation system 356 may have an option to request more information from a requester. This may involve asking clarifying questions from the person who asked the original query, or it may involve asking additional input in the form of another image or any other feedback.

Some systems may be deployed with a large number of human classifiers. For example, some systems may have tens, hundreds, or even thousands of human classifiers available to perform classifications. Such systems may be able to provide very quick response times for human-aided classification when a classifier produces a result with a poor confidence score.

In some cases, the human-in-the-loop process may be triggered to validate the performance of a classification engine even when the confidence score is above a predefined threshold. In such cases, a human interaction engine 324 may select certain classification analyses to be verified by a human. These classification analyses may have been those that have been classified with a high confidence score, but by having the humans validate the classification, two objectives may be achieved. First, the automated classification of an image and query may be verified as properly operating. Second, such a validation may be used for training and validating human operators.

In some scenarios, a large number of human operators may be deployed to quickly respond to a classification request. Such requests may be on a fast turnaround, such as where a manufacturing line may be held up pending the classification response. As a classification engine becomes better trained and more reliable, the human operators may see less frequent classification request. As such, the human operators may lose some of their efficiency and accuracy. By sending occasional classification requests to human operators, the human operators may keep their classification skills up to date and current. Such occasional classification requests may be previously classified requests processed by a classification engine.

A retraining system 360 may update a classification engine. A retraining system 360 may operate on a hardware platform 362 and may use human-classified data 364 to retrain a classifier using a retraining engine 366. Some systems may retrain a classifier immediately when a newly classified image may be processed by a human classifier. Other systems may store the human-classified images and retrain the classifier in a batch operation.

Many classifiers may be built using various types of machine learning systems, one example may be neural net systems. Neural nets may be "trained" by processing a set of pre-classified data through the net. The larger and more accurate the training dataset, the better performance of the classifier. The retraining engine 366 may be periodically run against an existing classification algorithm and retrained using updated data from the human operators.

Figure 4:
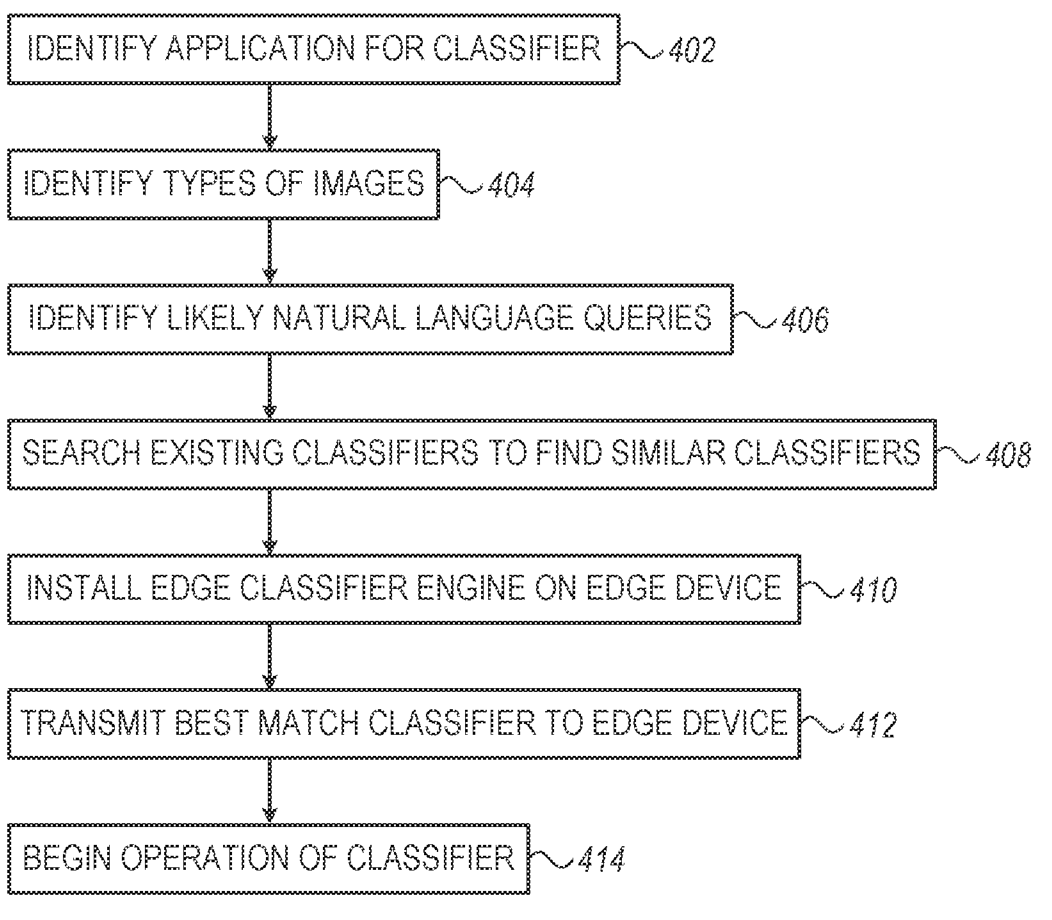
FIG. 4 is a flowchart illustration of an embodiment showing a method for deploying a classifier using image analysis and natural language processing.

FIG. 4 is a flowchart illustration of an embodiment 400 showing a method for deployment of a classifier system. The operations of embodiment 400 show one workflow of how a classification system may be deployed using a group of pre-configured classification systems. Once deployed, a classifier may be further trained for a specific use case.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates one method by which classifiers may be immediately deployed. A conventional deployment may be to identify a training set of images and queries, then train a neural net or other machine learning algorithm using the training set. Once trained, the algorithm may be deployed.

The conventional deployment has the complexity of generating a meaningful training set, which is not often available. For example, a vision system may be deployed in a security use case where queries may be performed against the images captured. The queries may be, for example, "Is everybody wearing safety glasses?" "Are their any visitors on the factory floor?" "What types of animals are outside?" "Whose car is in the parking lot?" or any other imaginable query.

In many cases, the queries that might be performed may not be fully understood, so a complete list of the queries may not be generated.

Further, the types of images that may be processed may not be fully available. In a security camera example, an image of a parking lot may change over the seasons and in different weather conditions. If deployed in the summer, images of a snow-covered parking lot in the winter may not be available. As such, it may not be possible to generate a complete set of possible images for processing.

Many pre-configured machine learning algorithms may be cataloged and stored. From this repository, one of the algorithms may be deployed directly, either with or without further training.

When a new application is identified in block 402, it may include identifying the types of images in block 404 as well as the likely natural language queries in block 406. The images and queries may be used to search existing classifiers in block 408 to find similar classifiers.

To deploy the classifier, an edge classifier engine may be installed on an edge device in block 410, then the classifier best matching the images and queries may be transmitted in block 412. The classifier may begin operation in block 414.

By deploying a classification engine quickly, a machine learning system may become operational immediately. With a human-in-the-loop training system, shown in a later figure, the system may be trained quickly and become more autonomous as more images and queries are processed.

Figure 5:
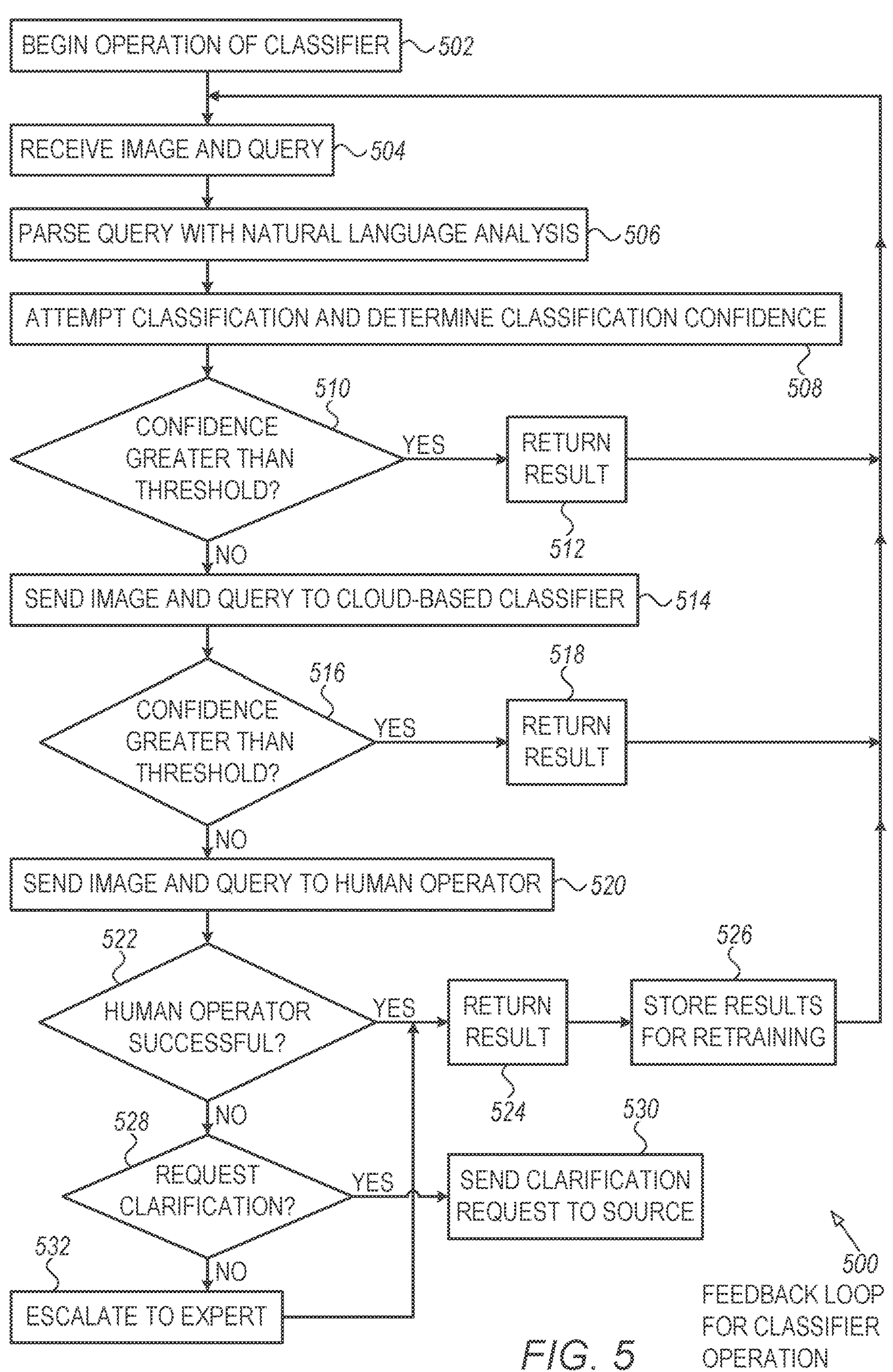
FIG. 5 is a flowchart illustration of an embodiment showing a method for handling classification issues using a human-in-the-loop.

FIG. 5 is a flowchart illustration of an embodiment 500 showing a method for a feedback loop of a machine learning system. The operations of embodiment 500 show one workflow where a machine classifier may attempt a classification, but when the classification has a low confidence, a human operator may perform the classification. In some cases, the human operator may request assistance of a higher tier operator.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is an example of human-in-the-loop classification assistance for an automated classifier. The human-in-the-loop classification workflow may help train a machine learning classifier using real-world examples of images and queries. As such, the human-in-the-loop classifications may generate a validated training set that may be used to re-train the machine learning classifier. As the machine learning classifier becomes more reliable and generates results with high confidence, the human-in-the-loop process may be used less frequently.

The process of embodiment 500 may be deployed to quickly train a classifier, such as the classifiers deployed in embodiment 400. Embodiment 400 may find a previously-configured classifier that has been trained using similar images and queries of some other application, but may deploy that classifier for a specific use case. The workflow of embodiment 500 may then be engaged to quickly train the classifier using human operators so that the machine learning system may begin operation Embodiment 500 is an example of a workflow where a machine learning classifier is deployed first, then trained in situ. This process is counter-intuitive to the normal procedure of training and validating a classifier, then deploying the classifier.

Machine learning classifiers that include both image processing and natural language queries have a much larger set of possible images and queries that may be processed than would conventional image-only classifiers. In a conventional image-only classifier, a machine learning classifier may be trained to find a small, defined set of objects or conditions in a set of images. In such cases, a reasonable set of training data may be quickly assembled and used to train a classifier. As such, much of the complexity of a human-in-the-loop workflow may be avoided.

When natural language queries may be added, the number of potential queries may be exponentially larger. Not only can natural language queries have many different ways to form a query statement, the queries themselves can be exponentially more complex.

For example, the query of "How many visitors are in the lobby?" may be run against a security camera image of a company's entrance. The query may involve several implicit steps: the location of each person may be found in an image, then the identity of each person may be determined. From the person's identity, the query may determine whether or not the individual people are employees or not. Those who may not be identified as employees may be considered visitors.

Such a complex classifier may be very difficult to deploy by first identifying all the potential options of images and queries, then generating a training set. However, by deploying a classifier previously trained with similar images and queries, then using a human-in-the-loop classification workflow, a very complex and sophisticated machine learning classifier may be deployed quickly. The accuracy of such a classifier may increase over time as the human-aided classifications are used to retrain the classifier.

A classifier may begin operation in block 502.

An image and a query may be received in block 504, and the natural language query may be parsed in block 506. The classifier may attempt classification in block 508.

If the confidence of the classifier is higher than a pre-determined threshold in block 510, the result may be returned in block 512 and the process may return to block 504 to process another image and query.

If the confidence of the classifier is lower than a pre-determined threshold in block 510, the query may be sent to a cloud-based classifier in block 514. A cloud-based classifier may operate across a network, and such a classifier may have more sophisticated algorithms and substantially more resources to process a query than an edge-based classifier.

If the cloud-based classifier generates a response with a confidence level higher than a pre-determined threshold in block 516, the response may be returned in block 518. The process may return to block 504 to process another image and query.

When the cloud-based classifier returns a result with a confidence level less than a predetermined threshold in block 516, the image and query may be sent to a human operator in block 520.

A human operator may receive a user interface that may show the image being evaluated as well as the query. The human operator may parse the query, then analyze the image to determine the result.

If the human operator is successful in block 522, the result may be returned in block 524 and the results may be stored for later retraining of the classifier in block 526. The process may return to block 504 to process another image and query.

If the human operator is not successful in block 522, the human operator may have the option to request clarification in block 528. Such a request may transmit a message to the query source in block 530. When the clarification is received, the human operator may continue the analysis.

A request for clarification may send a message, such as an email message, to a person who may have created the natural language query. In many cases, the natural language query may have inaccurate or ambiguous language, and a request for clarification may help the human operator understand the intent of the query. In other cases, the request for clarification may request clarification of features of the image.

If a human operator is not successful in block 522, the image and query may be escalated to an expert in block 532. The expert may be a higher-level human operator with additional expertise, experience, education, or other credentials that may be employed to solve the classification issue. The expert may have more available time and other resources to analyze the image and query to determine an appropriate response.

When the expert has generated a result, the process may continue to block 524 where the result may be returned and block 526 where the result may be stored for retraining. The process may return to block 504 to process another image and query.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

The invention claimed is:

1. A system comprising:

multiple processors configured to operate an application programming interface;

said application programming interface that:

receives, at an edge classifier, a first request comprising a first image and a first natural language request relating to said first image from a customer computer;

processes, at the edge classifier, said first natural language request and said first image through an automated machine learning engine to generate a first response comprising a confidence factor for the first response;

when the confidence factor is above a first predetermined threshold, responds, by the edge classifier, to said customer computer with said first response;

when said confidence factor is below said first predetermined threshold, transmits, by the edge classifier, said first natural language request and said first image to a first device, performs, at the first device, a human in the loop method comprising:

causing, by the first device, said first image and said first natural language request to be displayed on the first device; and receiving, by the first device, a human response through said first device, said human response being a response to said first natural language request with respect to said first image; and transmitting, by the first device, said human response through said application programming interface to said customer computer;

when said confidence factor is below a second predetermined threshold, transmits, by the edge classifier, said first natural language request and said first image to a cloud-based classifier;

processes, by the cloud-based classifier, said first natural language request and said first image through a second automated machine learning engine to generate a second response comprising a second confidence factor for said second response;

when said second confidence factor is above said first predetermined threshold, responds, by the cloud-based classifier, to said customer computer with said second response; and when said second confidence factor is below said first predetermined threshold, transmits, by the cloud-based classifier, said first natural language request and said first image to the first device, wherein the first device receives said first natural language request and said first image from the cloud-based classifier and performs said human in the loop method.

2. The system of claim 1, said first predetermined threshold being higher than said second predetermined threshold.

3. The system of claim 2, said second automated machine learning engine being physically located remotely from said automated machine learning engine.

4. The system of claim 1, the human in the loop method further comprising: receiving, by the first device, a clarification request from a human operator.

5. The system of claim 4, the human in the loop method further comprising: transmitting said clarification request to said customer computer.

6. The system of claim 5, the human in the loop method further comprising:

receiving a clarification response from said customer computer;

displaying said clarification response to said human operator; and receiving said human response based at least in part on said clarification response.

7. The system of claim 6, the application programming interface that further:

uses at least a portion of said clarification response to train said automated machine learning engine.

8. The system of claim 7, the application programming interface that further:

receives a second request, said second request being similar to said first request;

determines that at least a first portion of said clarification response applies to said second request; and displays at least a second portion of said clarification response on said first device.

9. The system of claim 4, the human in the loop method further comprising:

transmitting said clarification request to a second human, said second human generating a second human response; and transmitting said second human response to said customer computer.

10. The system of claim 9 further comprising:

storing said second human response and using said second human response to train said automated machine learning engine.

11. The system of claim 9, said second human having a higher level of expertise than a first human associated with the first device.

12. The system of claim 9, retraining said automated machine learning engine using at least a portion of said clarification request.

13. The system of claim 1, said human in the loop method being performed a plurality of times for said first request to generate a plurality of said human responses.

14. The system of claim 13, aggregating said plurality of human responses to find a consensus response and transmitting said consensus response to said customer computer.

15. The system of claim 1, said first request comprising a video sequence, said first image being one image of said video sequence.

16. The system of claim 1, wherein the edge classifier is deployed within a robot controller and the system further comprises a camera located on an industrial robot, wherein the first image is captured by the camera located on the industrial robot.

17. The system of claim 16, wherein the robot controller is configured to receive the first response and perform a sequence to realign a part if the first response indicates that the part is present and misaligned.

18. The system of claim 1, wherein:

causing said first image and said first natural language request to be displayed on the first device comprises presenting said first image and said first natural language request via a cell phone application; and receiving the human response through said first device comprises receiving input within the cell phone application.

19. The system of claim 1, wherein said application program interface further:

initially deploys a classification engine comprising partially-trained classification algorithm to the edge classifier, wherein the partially-trained classification algorithm is trained for a purpose different from a purpose associated with the first request; and replaces the classification engine with the automated machine learning engine, wherein the automated machine learning engine comprises an updated classification algorithm retrained on gathered human validated data points received from the first device.

20. The system of claim 19, further comprising a database containing pre-configured classification algorithms, wherein the partially-trained classification algorithm is selected from the pre-configured classification algorithms in accordance with a request for a classification algorithm having certain characteristics.

* * * * *